Patented May 3, 1949

2,468,762

UNITED STATES PATENT OFFICE 2,468,762

ACYLATION OF AROMATIC ALKOXY COMPOUNDS

Alvin I. Kosak, Columbus, Ohio, and Howard D. Hartough, Pitman, N. J., assignors to Socony-Vacuum Oil Company, Incorporated, a corporation of New York No Drawing. Application May 14, 1946, Serial No. 669,581

17 Claims. (Cl. 260—592)

This invention relates to a process for the acylation of aromatic alkoxy compounds and, more particularly, is directed to a method for acylating aromatic alkyl ethers in the presence of a small amount of iodine.

The acylation of aromatic alkoxy compounds, such as the phenyl alkyl ethers, has heretofore been carried out in the presence of a Friedel-Crafts type catalyst, principally aluminum chloride. While, in some instances, a relatively high yield of product has been obtained employing such catalyst, the acylation process has not been altogether free of operational difficulties. Thus, it has been found necessary to use at least a molecular equivalent amount of aluminum chloride catalyst per mole of acylating agent employed in order to effectively promote the acylation reaction. When aromatic alkoxy compounds are heated with such relatively large amounts of aluminum chloride, there is a tendency for cleavage to occur in the alkoxy group with formation of the corresponding phenol. This reaction has, in fact, been employed in some instances to dealkylate aromatic alkoxy compounds. However, where it is desired to obtain as a final product an acylated alkoxy aromatic, the above-mentioned cleavage is definitely undesirable. It has accordingly been necessary, using an aluminum chloride catalyst in the acylation process, to work at low temperatures or to reduce the time of contact of the alkoxy compound with the catalyst in order to minimize cleavage in the alkoxy side chain.

Acylation of aromatic alkoxy compounds in the presence of the required relatively large amounts of aluminum chloride has been further complicated by the formation of complexes between aluminum chloride and certain of the phenyl alkyl ethers, such as anisole. The formation of said complexes tends to reduce the yield of desired product. Heretofore, in order to obtain a substantial yield of acylated product when an aluminum chloride catalyst was used, it has been necessary to carry out the reaction in the presence of a diluent or solvent material, such as petroleum ether or carbon disulfide, to effectively reduce the tendency toward formation of undesirable resinous by-products, believed to be due primarily to the aforesaid complexes.

It has now been discovered that acylated aromatic alkoxy compounds may be obtained in an efficient manner by reacting the aromatic alkoxy compound to be treated with an acylating agent in the presence of a small amount of an iodine catalyst. It has been found that by using said catalyst, the above-mentioned difficulties encountered in the acylation of aromatic alkoxy compounds have largely been overcome. Thus, by employing an iodine catalyst, the tendency for cleavage of the alkoxy group to occur is substantially reduced so that the acylation reaction can be carried out in a direct manner without a detailed observance of experimental conditions, particularly maintenance of a low temperature and short reaction time such as is a necessary precaution to be taken when aluminum chloride is employed as catalyst. It has been found that iodine catalyst effects the acylation of aromatic alkoxy compounds without accompanying formation of complex addition products and that, accordingly, the necessity of using a diluent or solvent material, such as has heretofore been necessary to obtain a substantial yield of desired product, may be eliminated.

It is accordingly an object of the present invention to provide an efficient process for synthesizing acylated aromatic alkoxy compounds. Another object is to provide a process for catalytically acylating said compounds. A still further object is to afford a process for catalytically acylating aromatic alkoxy compounds in the presence of small amounts of an easily obtainable catalyst. A very important object is to provide a process capable of reacting aromatic alkoxy compounds with an acylating agent in the presence of small amounts of a catalyst without undue formation of addition complexes between the catalyst and said compounds and, further, without the tendency of a cleavage to occur during acylation in the alkoxy group of said compound, leading to formation of the corresponding phenol.

These and other objects which will be recognized by those skilled in the art are attained in accordance with the present invention wherein aromatic alkoxy compounds are acylated by reaction with organic carboxylic acid anhydrides or acyl halides in the presence of an iodine catalyst.

The catalyst to be used herein may be either iodine itself or a material capable of releasing or forming iodine under the acylation conditions. Representative of the latter material is hydriodic acid. This material may be used as a relatively dilute solution or as a saturated solution containing approximately 90 per cent hydrogen iodide. A particularly convenient hydriodic acid solution, however, for purposes of the present invention was found to be the acid of maximum boiling point containing approximately 55-58 per cent of hydrogen iodide. The aqueous solution of hydriodic acid when freshly prepared is colorless but rapidly becomes brown when exposed to air owing to the formation of iodine which dissolves in the acid. It is this property of hydriodic acid which renders it an effective catalyst for acylation of aromatic alkoxy compounds in accordance with the process of this invention. Iodine formation is believed to be accounted for by the following equation:

$$4HI + O_2 = 2H_2O + 2I_2$$

Other compounds, such as iodine dioxide, capable of forming iodine are likewise contemplated for use as catalyst in the present invention. Likewise, other iodine-containing compounds may be employed, such as certain iodates or oxygen-containing acids of iodine, which, in the presence of reducing agents, yield iodine under the acylation conditions. However, for all practical purposes, iodine itself is to be preferred as catalyst for acylating aromatic alkoxy compounds in accordance with the present process. Iodine may be introduced as acylation catalyst in the form of vapor, solution, or solid. The latter form is most conveniently handled and, accordingly, is to be preferred. While the present invention is not to be strictly limited to any specific small amount of catalyst, generally iodine will be employed in an amount between about 0.10 per cent and about 3 per cent by weight of the reactants. Amounts of iodine smaller than about .10 per cent by weight of the reactants do not function efficiently in promoting the acylation of aromatic alkoxy compounds requiring an excessively long reaction period or, in some instances, failing entirely to catalyze the reaction. On the other hand, amounts of iodine exceeding about 3 per cent by weight appear to lend no added advantage to the acylation process and larger amounts of iodine have a tendency to cause high exothermic reactions which are difficult to control.

Aromatic alkoxy compounds, in general, may be acylated by the process of this invention. These compounds comprise an aromatic group and an alkyl group joined by an ether linkage through an oxygen atom. The aromatic group so joined may be, for example, a phenyl, naphthyl, or anthryl group or a substituted derivative thereof, such as tolyl, chlor-naphthyl, brom-anthryl, and the like. The alkyl group may be a saturated or unsaturated radical, such as methyl, ethyl, benzyl, crotonyl, etc. The aromatic alkoxy compounds contemplated in this invention also include aromatic groups having attached thereto two or more alkoxy groups. Representative of the latter compounds are the dimethoxy benzenes, such as the dimethyl ether of catechol, resorcinol, and pyrogallol; the diethoxy benzenes; the dimethoxy naphthalenes; the diethoxy naphthalenes; dimethoxy anthracenes; the diethoxy anthracenes, etc. Veratrole (1,2, dimethoxy benzene) is a typical dialkyl ether which can be acylated in accordance with the present invention. The resulting acyl derivative can be easily converted into veratric acid, thus providing an efficient method for making this compound. Likewise, the synthesis of p-acetyl anisole, in accordance with the present invention, provides a relatively inexpensive means for making p-anisic acid therefrom by the haloform reaction. In a similar manner, other heretofore relatively expensive and difficultly obtainable compounds of interest to the drug industry might also be prepared from the acylated aromatic alkoxy compounds of this invention. While the description that follows hereinafter will be directed particularly to the acylation of the phenyl alkyl ethers, it should be understood that the present process will likewise be applicable for the acylation of aromatic alkoxy compounds generally.

The acylating agents to be used herein may be an acyl halide or an organic carboxylic acid anhydride. Included in the latter category are those compounds having the basic structure $$-\overset{|}{C}=C=O$$

which, upon addition of water, yield organic carboxylic acids. These acylating agents may be derived by methods well known to the art from mono- or polybasic organic acids which may be either unsaturated or saturated. Thus, representative acylating agents to be used in this invention include the anhydrides of saturated fatty acids, such as acetic anhydride, propionic anhydride, ketene, etc.; the acyl halides of saturated fatty acids, such as acetyl chloride, stearyl chloride, etc.; the acyl halides of dibasic acids, such as phthalyl chloride; the acyl halides of aromatic acids, such as benzoyl chloride; the anhydrides of unsaturated acids, such as crotonic anhydride; and the acyl halides of unsaturated acids, such as crotonyl chloride. These acylating agents are given merely by way of examples and are not to be construed as limiting, since other acyl halides or anhydrides of carboxylic acids, which will readily suggest themselves to those skilled in the art, may likewise be used.

The acylation of aromatic alkoxy compounds may be carried out employing equimolar quantities of said compound and acylating agent. However, the presence of an excess of acylating agent has, in general, been found to be preferable for the purposes of the present invention.

The temperature at which time reaction was carried out may vary over a wide extent, the upper limit of temperature being dependent on the boiling point of the reactants at the specific pressure of the reaction. In general, temperatures varying between about 25° C. and about 150° C. and pressures varying between about atmospheric and about 10 atmospheres have been found to be satisfactory for effecting the acylation reaction. The effect of increased pressure, theoretically, is toward increased reaction but, from a practical standpoint, this is not a very great effect with reactions such as involved herein, which go readily at normal pressures. The temperature to be employed will depend upon the time of reaction and the nature of the acylating agent used. The period of reaction necessary to effect complete acylation of the aromatic alkoxy compound will generally be between about 0.5 and about 5 hours.

While the present invention is not to be limited by any theory, the catalytic action of materials other than iodine, disclosed herein as suitable acylation catalyst for aromatic alkoxy compounds, is believed to be intimately connected with the fact that they yield iodine under the conditions of the acylation process. A marked example of this effect is the catalytic action of hydriodic acid which tends to decompose forming iodine during the acylation process. It is of interest to note that the other hydrohalogen acids, such as hydrochloric, hydrobromic, or hydrofluoric acid, in catalytic amounts, fail to exert any catalytic action in the acylation of aromatic alkoxy compounds. Likewise, iodic acid and iodic anhydride do not exhibit any tendency to promote the acylation reaction, although if a reducing agent is introduced into the reaction mixture causing the reduction of iodic acid to iodine, the acylating reaction takes place.

The following detailed examples are for the purpose of illustrating modes of effecting the acylation of aromatic alkoxy compounds in accordance with the process of this invention. It is to be clearly understood that this invention is not to be considered as limited to the specific acylating agents disclosed hereinafter or to the particular conditions set forth in the examples.

Example 1

To a mixture of 54 grams (0.5) of anisole and 107 grams (1 mole) of 95 per cent acetic anhydride was added 0.3 gram of iodine. The reaction mixture was heated at a temperature of 135–140° C. for 1.5 hours. At the end of this time, the reaction mixture was cooled and 200 millimeters of water were added, and the mixture stirred 0.25 hours. The organic layer was then drawn off, the water layer was washed with chloroform, and the washings were added to the original organic layer. The organic-containing solution was then washed with sodium carbonate solution until neutral and then washed with sodium thiosulfate solution to remove iodine. The remaining material was then distilled, removing the chloroform and yielding 7 grams of para-acetylanisole. This amount represents a 42 per cent conversion based on the weight of anisole consumed. Forty-two grams of anisole were recovered which could be recycled for further acylation.

Example 2

To a mixture of 54 grams of anisole and 107 grams of 95 per cent acetic anhydride were added 2 grams of iodine. The reaction mixture was heated at a temperature of 110–112° C. for a period of 2 hours. At the end of this time, the reaction product mixture was cooled and treated as in Example 1, yielding 8 grams of para-acetylanisole. This amount represents a conversion of 65 per cent based on the weight of anisole consumed. Forty-five grams of anisole were recovered which could be re-cycled for further acylation.

Example 3

To a mixture of 54 grams of anisole and 107 grams of 95 per cent acetic anhydride were added 4 grams of iodine. The reaction mixture was heated at a temperature of 110–117° C. for a period of 2½ hours. At the end of this time, the reaction mixture was cooled and treated as in Example 1, yielding 38 grams of para-acetylanisole. This amount represents a conversion of 81 per cent based on the weight of anisole consumed. Twenty grams of anisole were recovered which could be recycled for further acylation.

Example 4

To a mixture of 54 grams of anisole and 107 grams of 95 per cent acetic anhydride were added 4 grams of 55.8 per cent hydriodic acid. The reaction mixture was heated at a temperature of 110–118° C. for a period of 2 hours. At the end of this time the reaction mixture was cooled and treated as in Example 1 to yield 42 grams of para-acetylanisole. This amount represents a conversion of 74 per cent based on the weight of anisole consumed. Thirteen grams of anisole were recovered which could be recycled for further acylation.

Example 5

To 50 grams of phenetole were added 70 grams of benzoyl chloride and 2 grams of 55.8 per cent hydriodic acid. The reaction mixture was heated at 100–120° C. for a period of 4 hours. At the end of this time, the reaction product mixture was cooled and washed with caustic solution to decompose excess benzoyl chloride. The resulting product was then diluted with 200 milliliters of benzene and thereafter washed with sodium thiosulfate solution to remove iodine. The resulting material was then distilled, yielding 17 grams of para-benzoylphenetole. This amount represents a conversion of 71 per cent based on the weight of phenetole consumed. Thirty-seven grams of phenetole were recovered which could be recycled for further acylation.

We claim:

1. A process for acylating phenyl alkyl ethers, comprising reacting the same with an acylating agent selected from the group consisting of acyl halides of carboxylic acids and anhydrides of carboxylic acids in the presence of a small amount not more than about 3 percent by weight of iodine.

2. A process for acylating anisole, comprising reacting the same with an acylating agent selected from the group consisting of acyl halides of carboxylic acids and anhydrides of carboxylic acids in the presence of a small amount not more than about 3 percent by weight of iodine.

3. A process for acylating phenetole, comprising reacting the same with an acylating agent selected from the group consisting of acyl halides of carboxylic acids and anhydrides of carboxylic acids in the presence of a small amount not more than about 3 percent by weight of iodine.

4. A process for acylating phenyl alkyl ethers, comprising reacting the same with an acylating agent selected from the group consisting of acyl halides of carboxylic acids and anhydrides of carboxylic acids in the presence of an amount of iodine between about 0.10 per cent and about 3 per cent by weight based on the weight of the reactants.

5. A process for acylating anisole, comprising reacting the same with an acylating agent selected from the group consisting of acyl halides of carboxylic acids and anhydrides of carboxylic acids in the presence of an amount of iodine between about 0.10 per cent and about 3 per cent by weight based on the weight of the reactants.

6. A process for acylating phenetole, comprising reacting the same with an acylating agent selected from the group consisting of acyl halides of carboxylic acids and anhydrides of carboxylic acids in the presence of an amount of iodine between about 0.10 per cent and about 3 per cent by weight based on the weight of the reactants.

7. A process for acylating phenyl alkyl ethers, comprising reacting the same with an acylating agent selected from the group consisting of acyl halides of carboxylic acids and anhydrides of carboxylic acids in the presence of a small amount, not more than about 3 per cent by weight, of a catalyst of iodine and forming said catalyst in the reaction mixture by generation therein of iodine during the course of the aforesaid acylation.

8. A process for acylating phenyl alkyl ethers, comprising reacting the same with an acylating agent selected from the group consisting of acyl halides of carboxylic acids and anhydrides of carboxylic acids in the presence of a small amount, not more than about 3 per cent by weight, of a catalyst of iodine and forming said catalyst in the reaction mixture by generation therein of iodine from hydriodic acid during the course of the aforesaid acylation.

9. A process for acylating phenyl alkyl ethers, comprising reacting the same with an acylating agent selected from the group consisting of acyl halides of carboxylic acids and anhydrides of carboxylic acids in the presence of between about 0.10 per cent and about 3 per cent by weight based on the weight of the reactants of a catalyst of iodine and forming said catalyst in the reaction mixture by generation therein of iodine during the course of the aforesaid acylation.

10. A process for acylating phenyl alkyl ethers, comprising reacting the same with an acylating agent selected from the group consisting of acyl halides of carboxylic acids and anhydrides of carboxylic acids in the presence of between about 0.10 per cent and about 3 per cent by weight based on the weight of the reactants of a catalyst of iodine and forming said catalyst in the reaction mixture by generation therein of iodine from hydriodic acid during the course of the aforesaid acylation.

11. A process for acylating anisole, comprising reacting the same with an acylating agent selected from the group consisting of acyl halides of carboxylic acids and anhydrides of carboxylic acids in the presence of a small amount, not more than about 3 per cent by weight, of a catalyst of iodine and forming said catalyst in the reaction mixture by generation therein of iodine during the course of the aforesaid acylation.

12. A process for acylating phenetole, comprising reacting the same with an acylating agent selected from the group consisting of acyl halides of carboxylic acids and anhydrides of carboxylic acids in the presence of a small amount, not more than about 3 per cent by weight, of a catalyst of iodine and forming said catalyst in the reaction mixture by generation therein of iodine during the course of the aforesaid acylation.

13. A process for acylating anisole, comprising reacting the same with an acylating agent selected from the group consisting of acyl halides of carboxylic acids and anhydrides of carboxylic acids in the presence of between about 0.10 per cent and about 3 per cent by weight based on the weight of the reactants of a catalyst of iodine and forming said catalyst in the reaction mixture by generation therein of iodine during the course of the aforesaid acylation.

14. A process for acylating phenetole, comprising reacting the same with an acylating agent selected from the group consisting of acyl halides of carboxylic acids and anhydrides of carboxylic acids in the presence of between about 0.10 per cent and about 3 per cent by weight based on the weight of the reactants of a catalyst of iodine and forming said catalyst in the reaction mixture by generation therein of iodine during the course of the aforesaid acylation.

15. A process for acylating phenyl alkyl ethers, comprising reacting the same with an acylating agent selected from the group consisting of acyl halides of carboxylic acids and anhydrides of carboxylic acids in the presence of a small amount, not more than about 3 per cent by weight, of iodine at a temperature between about 25° C. and about 150° C. until the reaction is substantially complete, neutralizing the product resulting from the aforesaid reaction, removing iodine therefrom and distilling to obtain an acylated phenyl alkyl ether.

16. A process for acylating anisole, comprising reacting the same with an acylating agent selected from the group consisting of acyl halides of carboxylic acids and anhydrides of carboxylic acids in the presence of a small amount, not more than about 3 per cent by weight, of iodine at a temperature between about 25° C. and about 150° C. until the reaction is substantially complete, neutralizing the product resulting from the aforesaid reaction, removing iodine therefrom and distilling to obtain an acylated anisole.

17. A process for acylating phenetole, comprising reacting the same with an acylating agent selected from the group consisting of acyl halides of carboxylic acids and anhydrides of carboxylic acids in the presence of a small amount, not more than about 3 per cent by weight, of iodine at a temperature between about 25° C. and about 150° C. until the reaction is substantially complete, neutralizing the product resulting from the aforesaid reaction, removing iodine therefrom and distilling to obtain an acylated phenetole.

ALVIN I. KOSAK.
HOWARD D. HARTOUGH.

No references cited.